United States Patent
Kelly et al.

(12) United States Patent
    Kelly et al.

(10) Patent No.: US 7,234,828 B2
(45) Date of Patent: Jun. 26, 2007

(54) INTEGRATED SYSTEMS WITH ELECTROLUMINESCENT ILLUMINATION AND METHODS THEREOF

(76) Inventors: Robert Kelly, 1140 Cabrillo Ave., Burlingame, CA (US) 94010; Alexis Parr, 1 Edwards Ct., #207, Burlingame, CA (US) 94010

( * ) Notice: Subject to any disclaimer, the term of this patent is extended or adjusted under 35 U.S.C. 154(b) by 0 days.

(21) Appl. No.: 11/237,202

(22) Filed: Sep. 27, 2005

(65) Prior Publication Data
US 2006/0087830 A1    Apr. 27, 2006

Related U.S. Application Data

(60) Provisional application No. 60/613,826, filed on Sep. 27, 2004, provisional application No. 60/613,675, filed on Sep. 27, 2004.

(51) Int. Cl.
    *F21V 9/16* (2006.01)
(52) U.S. Cl. .................... 362/84; 362/556; 362/234; 362/253; 315/169.3; 313/511

(58) Field of Classification Search ............. 174/36, 174/112; 313/511, 169.1, 169.2, 169.3; 362/84, 362/234, 253, 556, 582, 217; 315/169.1, 315/169.2, 169.3
See application file for complete search history.

(56) References Cited

U.S. PATENT DOCUMENTS

| | | | |
|---|---|---|---|
| 5,876,863 A * | 3/1999 | Feldman et al. | 428/690 |
| 5,959,402 A | 9/1999 | Polyan | |
| 6,538,375 B1 * | 3/2003 | Duggal et al. | 313/506 |
| 2003/0206419 A1 * | 11/2003 | Longatti et al. | 362/551 |

* cited by examiner

*Primary Examiner*—Stephen F Husar
*Assistant Examiner*—Meghan K. Dunwiddie
(74) *Attorney, Agent, or Firm*—Morgan Lewis & Bockius LLP; Robin M. Silva, Esq.; Victor E. Johnson, Esq.

(57) ABSTRACT

An illumination device comprising a protective casing that comprises an illumination system of at least two band members and an illumination coating that has a communications line component with a first end and a second end, and a first power source connected to said illumination system.

19 Claims, 4 Drawing Sheets

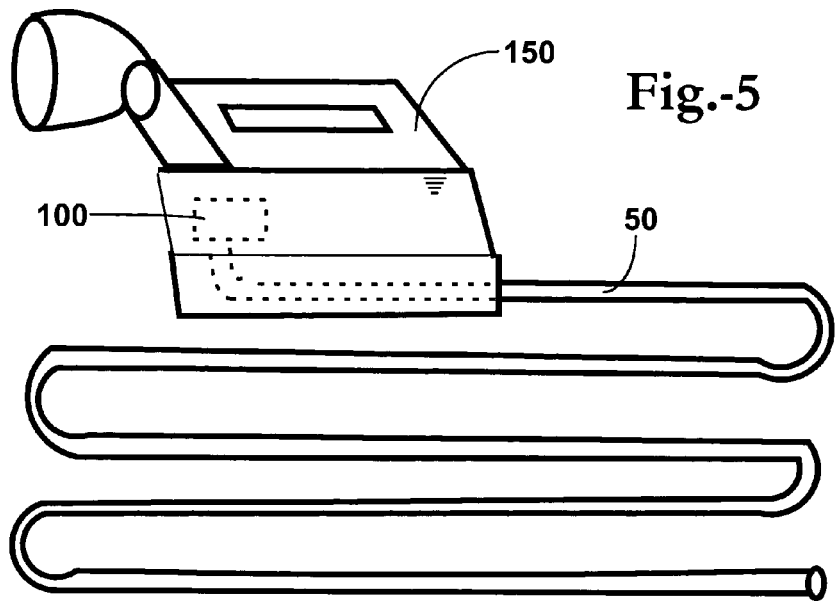
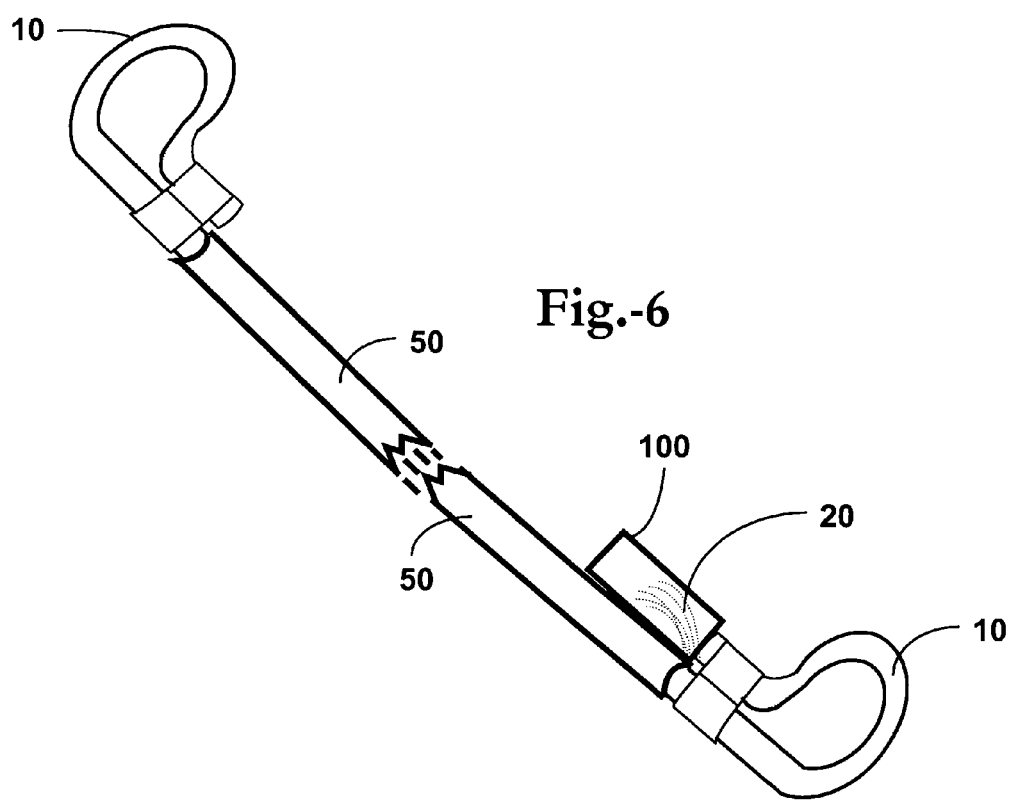

INTEGRATED SYSTEMS WITH ELECTROLUMINESCENT ILLUMINATION AND METHODS THEREOF

CROSS-REFERENCE TO RELATED APPLICATION(S)

This application claims benefit under 35 U.S.C. §119(e) of U.S. Ser. Nos. 60/613,826 and 60/613,675, both filed Sep. 27, 2004 both of which are expressly incorporated by reference in their entirety.

FIELD OF THE INVENTION

The invention relates to illumination devices comprised of an illuminated line that can be of any length. The device emits light of any color and has the ability to transfer data, sound or other communications, bear weight, be watertight or waterproof, and in certain forms can be resistant to temperature, vibration, crushing, cutting or other hazards.

BACKGROUND OF THE INVENTION

Since it was first available, the light bulb has been the cornerstone of man's ability to function in the dark. So much so that most civilized societies take for granted that some sort of illuminating product will be available when night falls or when the need for lighting a dim area presents itself. Nowhere is a light source more critical than under emergency conditions in a dark environment, where its mere presence can be the difference between life and death. A single beam of light can also have a psychological calming effect to those trapped in darkness, as well as those who will come to their aid. Examples of these conditions include tunnels, caves, fires, building collapses, confined spaces, power outages, underwater, or any place where the atmosphere or environment causes the absence of natural ambient light.

While no one can argue that there are not countless light sources available, the problem arises in the need of a light source that can be of used under a variety of these emergency conditions to provide a continuous line of illumination. As an example, a common flashlight provides a dependable light source with a directionally focused light beam that cannot light around curves. In a tunnel or building collapse where rescue workers would be making an extended entry into a dark confined space, it would be problematic to carry enough flashlights to light each turn and crevice in a consistent manner. Although there are linear (rope) lights available, many of these either require a constant AC energy source or a number of bulbs (e.g. LED) that can malfunction, break, or give an inconsistent light source. What is needed in these challenging environments is a light source that is lengthy, rugged, compact, continuous, consistent in lumen, flexible, bendable, able to function in a number of atmospheres (e.g. water, smoke), able to run on both AC and DC power for extended periods of time, able to withstand being hit, vibrated, twisted, jarred, shaken, and cut. Certain electroluminescent lights have been created in an attempt to solve this problem, but lack the weight bearing strength and integrity necessary to function in harsh environments.

Another problem arises in the need for communication during these events. Since the inception of the telegraph, the ability to transmit data has become an intricate part to both the stability and advancement of society as a whole. Communication is especially critical in emergency, hazardous, or disaster situations. The most commonly used method of sending and receiving data continues to be through mechanical means, primarily by the use of wires. While connected wires are taken for granted each day to accomplish a number of events, from watching television to accessing emergency services, communication becomes even more critical during crisis, disaster or military operations. Even the most sophisticated wireless systems at some point in their sequence require a transmission tower, repeater or other wired device as a support mechanism. These wireless devices may be rendered useless based on geographical influences, such as a confined space or tunnel, or in an area where radio frequency blocking devices have been engaged. Also, many tools, gadgets and appliances that are commonly referred to as wireless also routinely require a wired interface, such as a cell phone earphone/microphone, computer mouse cable, router, or other gadgets such as personal stereos, DVD players, or handheld games.

A continuing problem with both wired devices and wireless devices is that the cables that connect or support them can become jarred loose through normal daily actions (e.g. a bump, someone tripping over them, janitorial services, etc.) or direct action (e.g. weather, animals, tampering, sabotage). A single loose transmission wire can contribute to anything from a nuisance to a life threatening emergency.

While some appliances can notify the user of a loose or missing connection, it is often a costly addition that for most applications is cost prohibitive. The majority of wires used in home and industry are not equipped to accomplish notification and must be traced manually, resulting in breakdowns and delays. Certain wire configurations that encompass a illuminated element, such as a LED node can only be seen visually from one location and could not signal a lack of connection or power when seen from a separate view such as under a desk or in a wall or chase or tunnel. In an emergency situation a disconnected wire can be a life threatening matter.

BRIEF SUMMARY OF THE INVENTION

Accordingly, the present invention provides illumination devices comprising an optional protective casing around a combination of elements, including an illumination system comprising at least two band members and an illumination coating. In addition, the device includes a communications line component with a first end and a second end and optionally a first power source connected to the illumination system. As outlined herein, the power source can be attached to one end, both ends or one or more internal positions, or any combination thereof. In some cases, the protective casing further comprises a strength core component; alternatively, the communications line component serves also as the strength core component.

In an additional aspect, the illumination system comprises a plurality of band members, which can optionally include one or more band members that provide identifying signaling capabilities as described herein.

In a further aspect, the band members are wrapped around the communications line component and the core component to form an integrated lead.

In an additional aspect, the present invention provides devices that also have at least one communications module attached to one end of the integrated lead, with further aspects including the use of second communications module attached to the other end of the integrated lead. Communication modules can be a wide variety of devices as outlined herein, including, but not limited to, a receiver, a transmitter, a two-way radio, a speaker, a camera, a computer, a global positioning system, a headset and a sensor.

Other aspects envision the use of kits that contain the individual components that can be assembled by the end user.

In a further aspect, the invention provides methods of transmitting data through an illumination device. The methods provide an illumination device as outlined above and herein, with a first and a second communications module attached to the ends of the illumination device and then transmitting electronic signals between the two communications modules.

BRIEF DESCRIPTION OF THE DRAWINGS

FIG. 5 depicts the device used as part of a kit with a flashlight.

FIG. 6 depicts the device used as a weight bearing line.

DETAILED DESCRIPTION OF THE INVENTION

Figure 1:
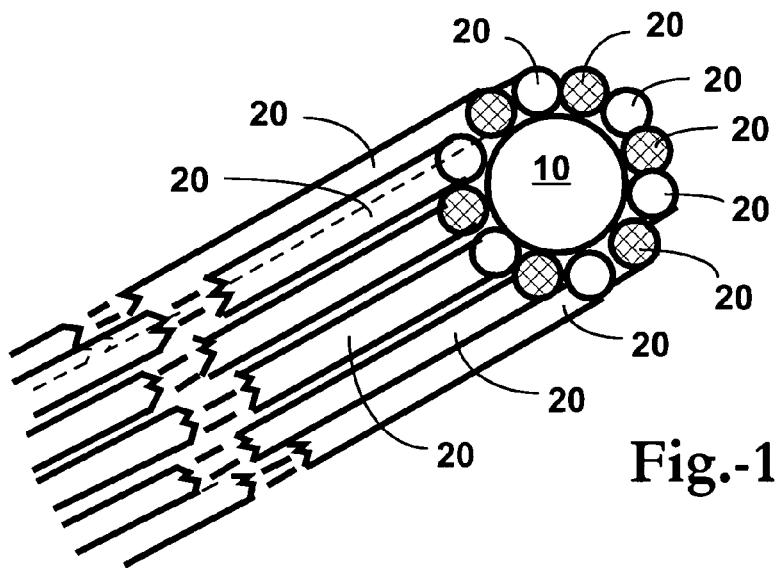
FIG. 1 depicts a cut away view of the device as an uncoated illuminated line.

The Resc-Hue™ Lite Line illumination device solves many of these problems by making use of improved electroluminescent technology. Those familiar with current electroluminescent light will appreciate the novel differences and problem solving capabilities that the Resc-Hue™ Lite Line addresses. The functional design of the device allows it to simultaneously solve a number lighting and communication problems that previous electroluminescent lines could not deliver.

The present invention is directed to the use of illumination devices that utilize electrochemiluminescent coatings (sometimes referred to herein as "illumination coatings") that chemoluminesce when placed in an electric field. See for example U.S. Pat. No. 5,959,402, incorporated by reference in its entirety. In general, the devices work by wrapping at least two band members around a supporting core (either a core component for strength, as outlined herein, or a communication line component, or both) to associate the band members into the long linear shapes that find the most utility. The band member are generally wires (although other configurations can be used, as outlined herein), one of which is positive and one is negative, to generate an electric field when attached to a power source. The field then acts on the electrochemiluminescent materials which are coated over the structures to cause illumination.

By forming long lines, or leads, contained within a protective casing, the illumination devices find use in rescue lines, for example for use by firefighters and search and rescue teams.

In addition, by including communication lines and communication modules, these rescue lines can serve to "hardwire" communications between a rescue worker in the field and the command post, so as to allow communication, transmittal of data, pictures, sensor information, etc.

This device has the ability to function for hours using a simple standard battery supply, can be quickly extended, withstand abuse, fit into minute crevices, and give off a consistent lumen in a number of different colors. It may also be used as a communication wire, weight bearing cable, and transmitting device.

Furthermore, the combination of an illumination system with a communication system allows for a variety of other uses as described herein, including illuminating wire leads, such as headsets for portable music players (e.g. iPods®) to indicate the player is on, or stereo wires to allow signaling when proper hookup is achieved.

Accordingly, the present invention provides illumination devices for use in a variety of configurations and utilities.

In one embodiment the device can be redundantly powered from both ends by a power source encased in a protective shell that encompasses either or both AC and DC current (Reference is made in part to U.S. Pat. No. 5,959,402). In the event of the Resc-Hue™ Lite Line being cut or severed, this configuration allows each detached half to remain illuminated from the point of each power source to a point near the area of the break. In the event the device is powered from a single source, the line will remain illuminated from the point of the power source to a point at or near to the severed area of line. Under certain applications the light may flash, flicker, vibrate, rotate or change color by means of a controller, switch, or as a reactive manner to being cut, damaged, or exposed to heat. In other applications the shell or coating of the device itself may change color to indicate surrounding conditions, such as a color change of the exterior shell itself to give visual notification of temperature or climate change.

Preferred power sources are standard batteries. Preferred power requirements can be met by using standard batteries (e.g. two 9 volt DC batteries) with a DC or AC power adapter for longer periods of operation (e.g. a cord that plugs into a 12v car adapter.) The preferred power source for the invention is an electrically matched inverter using AC or DC power. Other power sources could include a charge pump, step up or step down transformer or electric regulating device.

In other forms the device may be powered by mechanical, solar, salt water, chemical, or other reactive means. The device in other forms may be controlled manually, remotely by wires, infrared or other remote operating systems such as a computer, timer, electric eye or other controls that will be appreciated by those skilled in the art.

In certain other embodiments the illuminated cross section of the device can be of any length or diameter, round, square, or of any geometrical shape or design. In many cases, a protective casing can be used, preferably non-opaque, such that the light is seen through the coating. In some cases, for example for use with personal electronic devices, these casings are not required to be particularly strong to environmental or physical stresses. In other embodiments, for example for use in rescue lines, the protective casing is both resistant to environmental and physical stresses. For example, many types of silicone tubing are highly resistant to heat, are flexible and chemically inert to many compounds under a variety of conditions (e.g. extreme pH, organic solvents, etc.). Thus a wide variety of protective casings are suitable, including but not limited to a wide variety of polymers including plastics, silicone, rubbers, resins, etc. Thus the illumination system may be jacketed, dipped, covered with a resin, polymer, or other similar clear or colored coating.

The device can be linear or circular in final form, and may interconnect with either symmetrical or asymmetrical line, or attach to other apparatus (e.g. flashlight) as an adjunct or to access a remote power supply. In further embodiments the device may be attached to or interwoven into or with a rescue rope, line, cable, or cord in such a manner that it becomes part of a kit designed or assembled to perform operations that require the use of these adjuncts.

The device may include a core component (sometimes referred to herein as a "cable") that can withstand weight or resistance at any lower weight limit and an unlimited higher limit. An example of this would be as a raising or lowering device for a winch off a helicopter that would be illuminated during night operations to present a visual identification of the location of the line. Thus, in some embodiments, the cable is made of materials that give the devices strength, such as metal cable, high strength rope, plastic or fiber (e.g. Kevlar®), or any combination of materials that can be woven, attached or combined to provide the desired core component. In general, in these embodiments, the core and/or integrated device is rated for greater than about 100 lbs per unit (e.g. including tensile strength, breaking strength. load bearing capability or working load) up to 200, 300, 500, 1,000 and 10,000 lbs. Alternatively, in some embodiments (e.g. personal electronics) the core component may be absent, or may be rated for low strengths (less than 20 pounds per unit) by using non-metallice or low strength core members (e.g. fiber optic cable) or the use of smaller guage wires (e.g. single or paired stranded wire with AWG of 20 or higher).

In additional applications the device may be sewn, glued, threaded, weaved or attached to clothing in either a removable or non-removal manner (e.g. to illuminate a Firefighter's jacket, pants, helmet and boots) to enhance visibility of the wearer. As stated above, in other forms the device may be powered by mechanical, solar, salt water, chemical, or other reactive means.

In further embodiments the device may carry a linear communication, air, water, fluid, power or other transfer device either built in or as an attachment to it. These communication adjuncts separately or as part of a kit may include headphones or headsets, telephone, voice, global positioning, computer, camera, DC or AC power or other applications that can enhance operations in both normal and adverse conditions. While optimally designed for rugged use, those skilled in the art can appreciate the device also being used for more traditional consumer orientated products e.g. headphones for a portable music playing device or cell phone, or speaker wire which carries both light and sound or data. An example of this benefit would be illuminating the wires leading to the earphones of a cellular phone or personal music player.

Additionally, in conjunction with or separate of any of the aforementioned functions the device comprises signaling components. For example, the device may emit a signal that would identify it's presence through traditional means such as sound and light, or non traditional or covert means through infrared light, very high or very low frequencies, by the inclusion of a heat source, identifying signal wire or a reactive chemical included in the shell or coating resin that reacts to signal, light or heat sent through the device. An example of this would be an infrared signal designed to be visualized through the use of compatible night vision goggles that would identify the position of the device when activated but not when illuminated. Thus, for example, one or more of the band members that are used can be infrared material components such as a thermal resistance heater component, or band members that contain ultraviolet dyes, etc.

In a further application the signal from the line may activate or deactivate communication by means of corresponding or signaling with proximal devices through frequency transmissions. A secondary example of this would be a minefield where the device would be placed as a marking line for troop movement. The line may be initially activated through infrared frequency to note its position by GPS or compatible night vision, activated secondarily to disable by transmitting a signal wave to proximal mines or other devices that have corresponding frequencies and thus to allowing movement of personnel, thirdly illuminated to allow hasty return or the movement of civilians through a well marked illuminated pathway, and finally sending an alternate signal to reengage mines or other devices. Thus, these examples can be included as communication modules.

In another preferred embodiment the device would be constructed in a watertight or waterproof configuration, allowing for a similar scenario as presented above in a naval situation.

Another advantage of the Resc-Hue™ Lite Line over traditional electroluminescent light is its ability to carry both light and communication redundantly. The Resc-Hue Lite Line will allow almost anyone to tell if a wire is not connected simply by looking at it. This will result in an average person being able to locate a loose or missing wire without using expensive electronic tracing equipment, whether it is a single strand or part of a bundled set of wires.

This technology allows the device to be illuminated either when connected properly, when in use, or by activation of a switch, lever or key or other initiating device.

In one embodiment the device will be part of a consumer assembled gadget or appliance that encompasses communication wires, power cords or antenna wires such as a home stereo, DVD or computer system. As the system is properly assembled and wires are placed in the correct location, the wires will illuminate using a cost effective low voltage system. Should they become dislodged they will no longer illuminate (or in certain applications of the device will illuminate when dislodged or when a switch or activating device signals them), which will immediately allow an average person without any special knowledge to identify which wire remains to be connected or may have been dislodged. An added benefit of this device separate from rescue use will be the decorative display of exposed wires, which under many conditions are not aesthetically pleasing. As the wires of the device can be of many colors, identification of the wire can be color coded with a complimentary plug.

Another advantage provided by this device is its ability under certain configurations to illuminate only when being used. This could be a critical safety factor during emergency situations. The illuminated device wires would alert co-workers or associates from a distance that the person using the device was in use and may wish to not be disturbed, or may not be able to hear nearby sounds. In further environments the device may have safety implications, such as signaling a driver that a pedestrian with earphones may not hear their vehicle. The device would have even greater safety value at night, such as lighting cords or other wires that could become a trip hazard.

As mentioned, the Resc-Hue™ Lite Line can be designed to flash in the event of a broken wire from the point of the power source to the a point near the break. In this embodiment the device would not only identify a severed wire, it would also lead to the point proximal to the break.

Additional applications of the device may include electrical, telephone, cable, patch cable, fiber optic or other transmission wires used on a utility pole, tower, tunnel, chase, splice box, conduit, pipe, tube or other commonly used encasement. The device may be attached to or formed around a hose, pipe, tube, channel, or transmission box or panel.

Further use of the device in additional embodiments would include automobile, home or business wiring, wiring harnesses, junction boxes or other applications that require connected wires to communicate data, electricity, video, signals, sounds, impulses or other transmissions that can be conveyed through these or other mediums.

In additional embodiments the device may be part of a marking line or search kit, e.g. a flashlight with an extendable light line that is attached or contained within the flashlight shell, a designed loop for attachment, and a carabiner or other method to connect the line to an anchor or object.

Thus, the present invention provides a means of illuminating a line that can be of any length, width, or shape with the added ability to carry, transmit or receive data of any type.

The device satisfies the needs of rescue workers, military personnel, or in commercial applications where a need is present for a visual source of light that will function under adverse natural or manmade conditions or environments. It addresses the problem of bringing light to tunnels or confined spaces or any environment where a continuous and steady light source is either necessary or desired and standard power sources are either not available or delayed. The device will also find use in underwater applications where either a weight bearing or floating linear light source would provide an advantage in murky or clouded water, or at night. In consumer applications the device finds use by individuals who wish to have illuminated cable for safety or aesthetics reasons.

In general the device consists of a core member surrounded by a wrapping of band members that to surround a core. These band members are treated with a film of electroluminescent material that coats the wires and creates a dielectric space between them. The band members are then encrusted with an exterior material that protects and seals both the core and band members. These band members are then charged electrically creating a dynamic light effect.

As desired the core of the device can bear weight, carry transmission lines or send signals, as well as the band members.

In a preferred embodiment the band members are matched with the core to create a concentric circle with an even number of wires. In certain other embodiments an odd number of band members may be used to add a separate transmission line or to stagger the dynamic light effect.

In FIG. 1 reference is made to a core, 10. This core is composed of wire, cable, a group of wires, a tube, tubes, ducts, airlines, liquid line, fiber optic lines or any linear transmission or signaling appliance that can be partially or fully encased. This core can be continuous in length and size, graduate, or alternate as to the core's composition. The core may function as a strength member, or as desired a communication, power, data, or other transmission line. The shape of the core can be circular, rectangular, oval, square or of any symmetrical or asymmetrical shape, and may be made of coated or uncoated copper, silver, metal, galvanized metal, steel, fiber, Kevlar®, Aramid®, rope, plastic, nylon, Teflon®, hemp, rubber, polymer, or similar materials. The core is surrounded by band members, 20, that are comprised of materials, shapes and configurations similar to the aforementioned materials. The band members, 20 can be stranded, glued, taped, heated, spiraled, wrapped or affixed in any manner to the core, 10. These band members, 20 may serve an individual function, e.g. carry power or multiple functions, e.g. carry power, data, sound and images.

Figure 2:
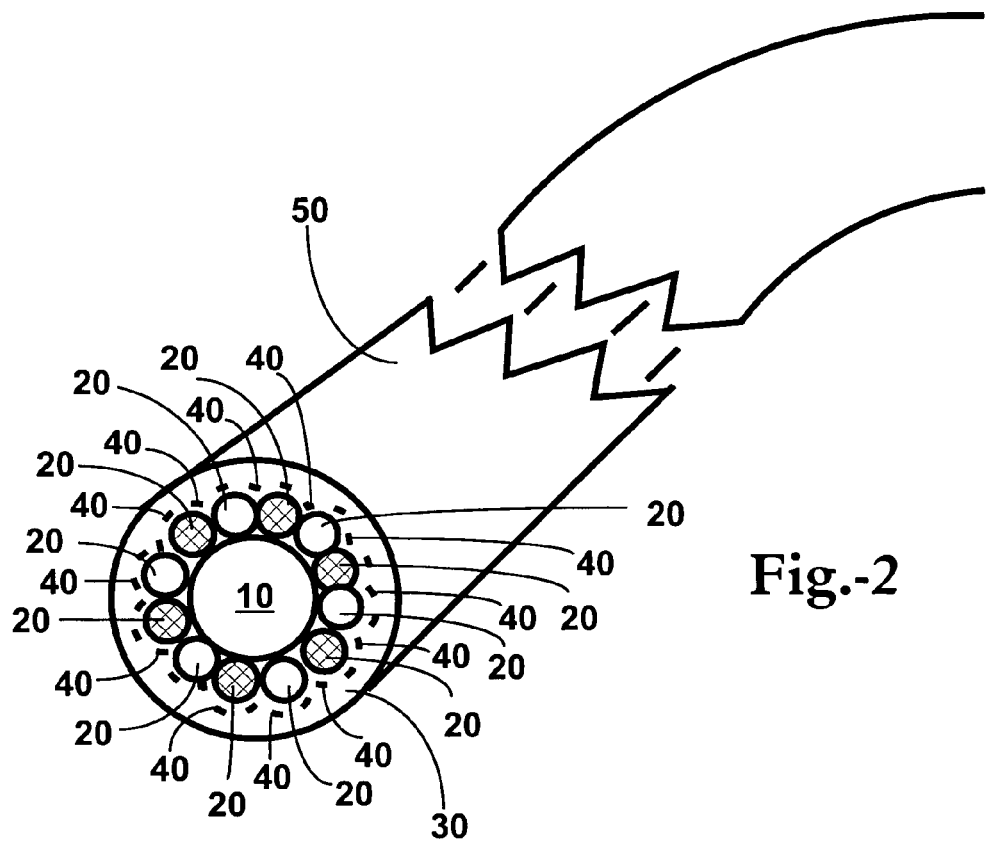
FIG. 2 depicts a cut away view of the device as a coated illuminated line.

FIG. 2 depicts the Resc-Hue Lite Line, 50, (**also referred to as the integrated which is comprised of the core, 10, band members, 20, and covered with an exterior coating, 30. This coating may be of silicon, plastic, resin, rubber, Elvax®), nylon, Teflon®, a synthetic or polymer mix, or a combination of materials and chemicals to provide a rugged, durable exterior. The coating can be dipped, veneered, extruded, free formed, baked, jacketed, or a combination of each. Between the band members, 20, and the coating, 30 is a layer or layers of electroluminescent film, 40. This film may be phosphor, resin, plastic, synthetic or any combination of materials that would encourage a dielectric dynamic light.

Figure 3:
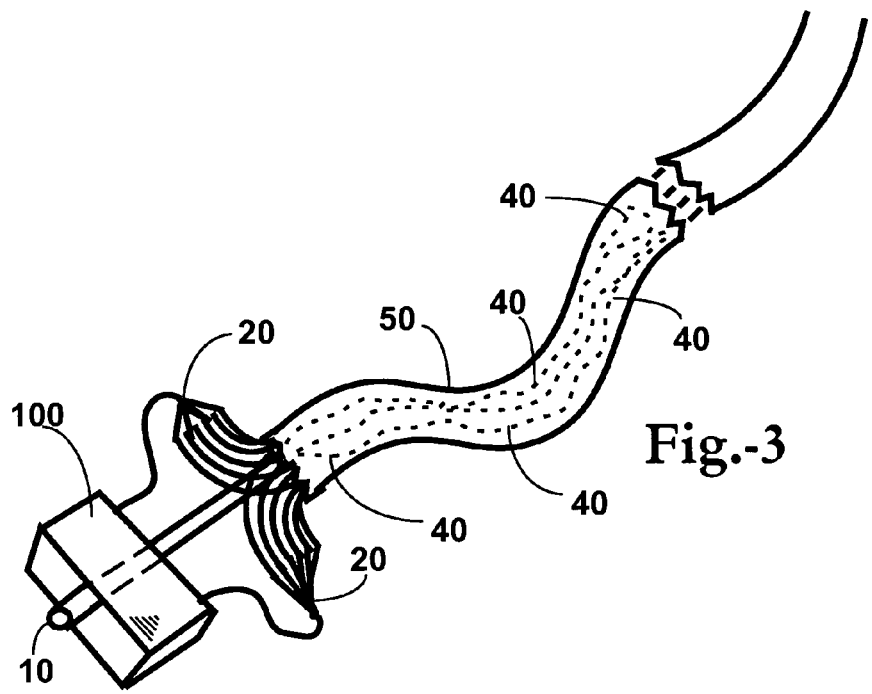
FIG. 3 depicts the device as an illuminated line with a single power source.

FIG. 3 depicts the Resc-Hue™ Lite Line, 50 connected to a single power source, 100. Core, 10, is attached in such a manner as to secure the device near or to the power source which may be contained in a box, cylinder, bag, tube or other receptacle. This power source may be AC, DC, Solar, or a combination of power sources. The dynamic light effect is achieved by connecting band members, 20, to a matched electrical source that will enable dielectric charging of the electroluminescent film, 40. In a preferred embodiment the power source will contain an electrical initiating device using battery power from rechargeable, lithium, ion, gel, lead, or other battery sources, and/or a connector or connectors to enable the use of standard power sources such as a DC battery, AC, or other voltages or currents that will support illuminating the device. Although the preferred embodiment is depicted, those skilled in the art of electrical power will note that the power source may be at either end of the device, in line, and be singular or multiple in nature. In other aspects of the device a single power source may be used to provide energy to a number of devices, allowing numerous lines to be attached, extended, plugged in or switched.

Figure 4:
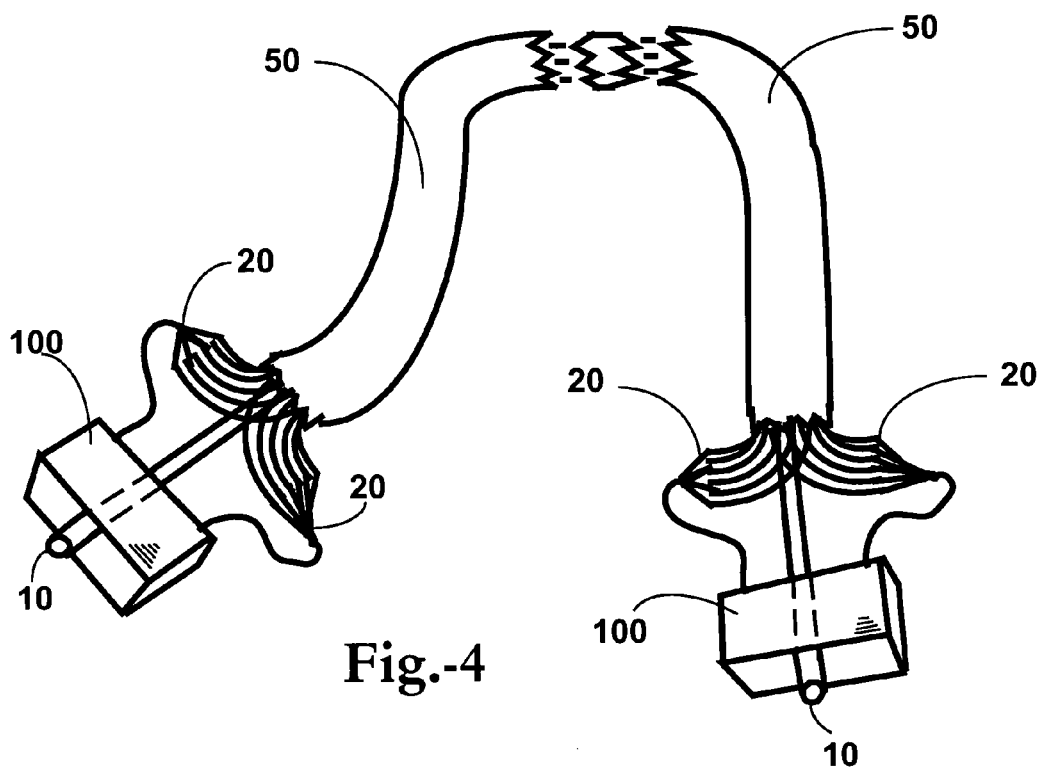
FIG. 4 depicts the device as an illuminated line with a dual power source.

FIG. 4 depicts the device, 50, being powered by multiple power sources, 100.

FIG. 5 depicts the device 50, as part of a kit or attachment to a flashlight, 150, where the power source, 100 is built in to, attached to, or joined as part of a single unit. In this configuration the device, 50, may be powered by its own battery, share batteries with the kit, or be connected to an external power source.

FIG. 6 depicts the device, 50, as a weight bearing line where the core, 10, is made of cable, rope or other weight bearing material. The core, 10, can be exposed and tied, braided, looped, annealed or swaged in such a manner as to allow attachment on one or both sides in such a manner that the device, 50, floats on the core, 10, in such a manner that it receives reduced stress from the bearing of weight. This core, 10, can be of any size or makeup as to support the desired load or function.

Figure 7:
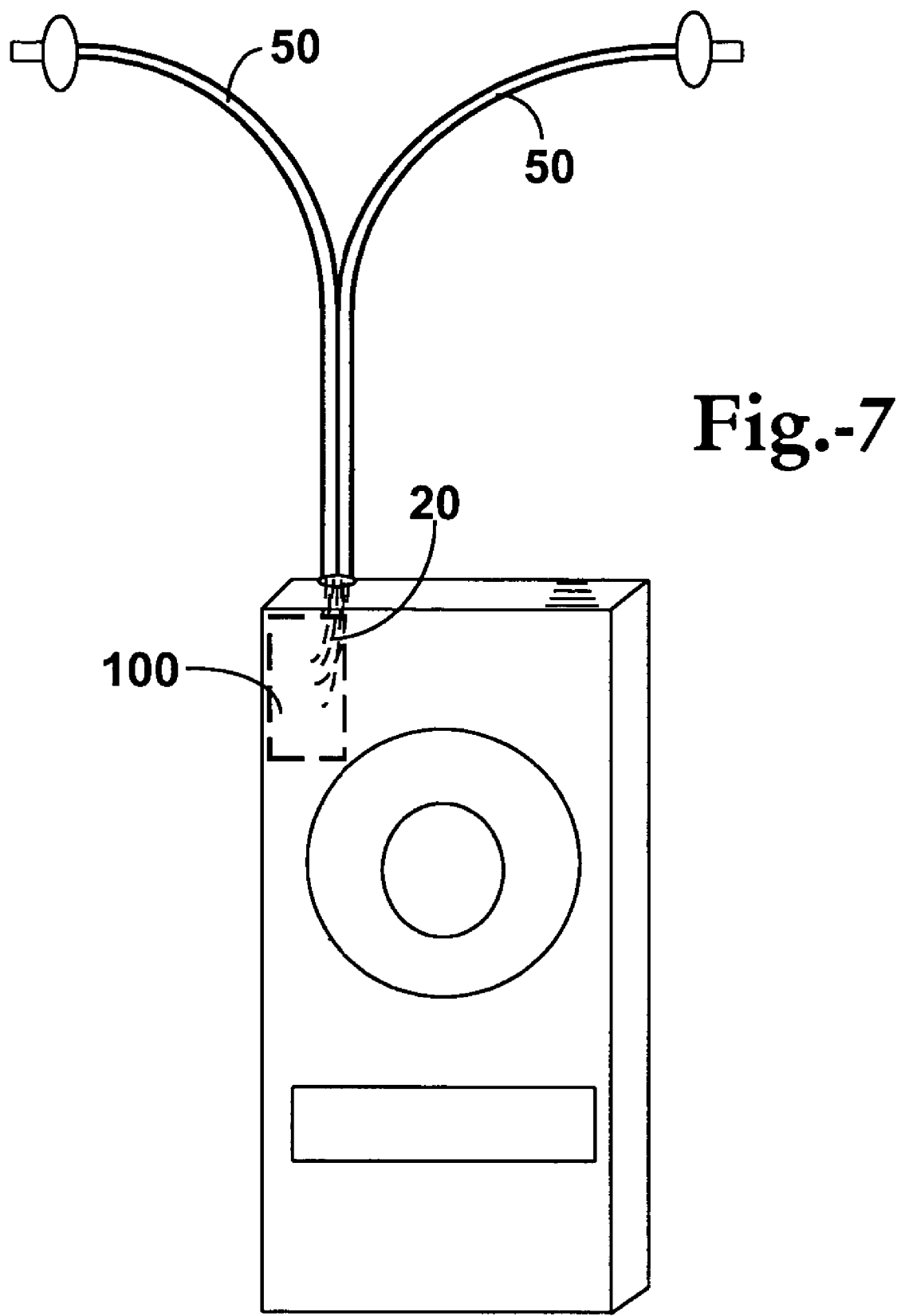
FIG. 7 depicts the device used as a consumer headset.

FIG. 7 depicts the device used in a consumer application as illuminated headphone wires.

In one embodiment, the devices of the invention include one or more communication modules. A "communication module" in this context can be any number of transmitters, receivers, or both, e.g. communications modules that serve both to transmit and receive, such as two-way radios, etc. Suitable communication modules include, but are not limited to, a receiver, a transmitter, a two-way radio, a speaker, a camera, a computer, a global positioning system, a headset a sensor (heat, vapor, etc, as outlined herein).

EXAMPLE 1

The core was surrounded with band members that were spiraled or wound to form a line in the desired length and spooled to a reel. The reel was placed in such a manner as to encourage a graduated payout of the line (e.g. designed reel holder on one end and a wire pulling machine on the other end).

The line was then sprayed, coated, or dipped in a manner as to ensure 360 degree coating with an ultra-violet curable photo initiated urethane based resin (e.g. Durathane®), Dupont 5018 UV Dielectric) mixed with raw phosphor that is encapsulated or unencapsulated based on the desired lighting effect. The mixture of resin to phosphor was a starting ratio of 2:3 but can be adjusted accordingly based on factors such as line size and adhesion.

After coating the line was baked using a high temperature UV curing light, (although in certain aspects it may desirable to bake the line in a heated chamber). The line was then tensioned through an extrusion device that sealed and coated the line using the desired jacketing material (e.g. Elvax®) and then cooled in water (although forced air cooling may also be used).

The line was then re-spooled for ease of transport. When ready for use the desired length of line was cut and the ends were stripped of jacketing material. The band members were separated from the core in such a manner as to group every other member together until two groups are formed where no band member is adjacent to another band member in the same group. These band members are then combined and attached to a power inverter that operates in a normal range of 12 to 18 volts DC (although in certain applications it may be necessary to have more or less power) in such a manner as that one group was charged positively and another group was charged negatively.

When a line of the desired length was attached to a matched power inverter a field of energy was created between the band members that electrically stimulate the resin held phosphor causing it to emit light, creating a dynamic lighting effect commonly referred to as electroluminescence. This lighting effect will continue until such time as the electrical field is no longer present (although the phosphor will emit light for a short period of time in the absence of power) such as turning the inverter off or losing the source of power (e.g. unplugged or battery drain), a short circuit or arc disrupts the field, or the properties inherent to the phosphor are no longer present.

EXAMPLE 2

In field tests the illumination device was used by career Firefighters under simulated fire conditions in a dark environment encompassing both heat and smoke. Encased in a silicone jacket the device remained resistive to the effects of both the heat and smoke and provided a visual signal of the location of the line that would normally have been undetectable to the human eye. The advantage of the illuminated line was the ability of the Firefighters to safely navigate changing terrain e.g. stairs and collapse props in otherwise murky conditions, and for subsequent teams of Firefighters to quickly locate and link up with members located at the end of the illumination device. An added benefit of the presence of the light was a corresponding increase in the confidence threshold of those involved in the testing.

The invention claimed is:

1. An illumination device comprising:
   a protective casing comprising;
   an illumination system comprising at least two band members, one being positive and one being negative, and an illumination coating;
   a communications line component with a first end and a second end; and
   a first power source connected to said illumination system;
   wherein the band members extend in a cylindrical layer between said protective casing and said communications line component and wherein the band members extend parallel to one another in said cylindrical layer.

2. A device according to claim 1 wherein said protective casing further comprises a strength core component.

3. A device according to claim 1 wherein said communications line component is a strength core component.

4. A device according to claim 1 wherein said illumination system comprises a plurality of pairs of band members.

5. A device according to claim 2 wherein said band members are wrapped around said communications line component and said core component to form an integrated lead.

6. A device according to claim 5 further comprising at least one communications module attached to one end of said integrated lead.

7. A device according to claim 6 further comprising a second communications module attached to the other end of said integrated lead.

8. A device according to claim 1 wherein said first power source is connected to a first end of said illumination system.

9. A device according to claim 1 wherein said communications line component is a data transfer line.

10. A device according to claim 6 wherein said communications module is selected from the group consisting of a receiver, a transmitter, a two-way radio, a speaker, a camera, a computer, a global positioning system, a headset and a sensor.

11. A method of transmitting data through an illumination device comprising:
    a) providing an illumination device according to claim 7; and
    b) transmitting electronic signals from a first communications module to said second communications module.

12. A device according to claim 1 wherein the band members extend linearly within said cylindrical layer.

13. An illumination device according to claim 1 further comprising:
    a core component with a first end and a second end, the core component having an axial load rating of at least 100 pounds.

14. A device according to claim 13 wherein said core component is a communications line component.

15. A device according to claim 14 wherein said communications line component is a fiber optic line.

16. A device according to claim 13 wherein said core component has an axial load raring of at least 1000 pounds.

17. A device according to claim 13 wherein said core component has an axial load rating of at least 10,000 pounds.

18. An illumination comprising:
    a) a protective casing comprising:
       i) an illumination system comprising at least two band members and an illumination coating;
       ii) a communications line component with a first end and a second end; and b) a first power source connected to said illumination system;

wherein said power source is connected to a middle portion of said illumination system.

19. An illumination comprising:
a) a protective casing comprising:
   i) an illumination system comprising at least two band members and an illumination coating;
   ii) a communications line component with a first end and a second end; and b) a first power source connected to said illumination system;

wherein said power source is connected to a first end of said illumination system;

said device further comprising a second power source connected to a second end of said illumination system.

* * * * *